(12) United States Patent
Baughman et al.

(10) Patent No.: US 10,572,904 B2
(45) Date of Patent: Feb. 25, 2020

(54) MICRO CIRCADIAN RHYTHMS DRIVEN DYNAMIC PRODUCT OFFERING ADJUSTMENT

(71) Applicant: International Business Machines Corporation, Armonk, NY (US)

(72) Inventors: Aaron K. Baughman, Silver Spring, MD (US); Ann M. Corrao, Raleigh, NC (US); Brian F. Ober, Lake in the Hills, IL (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 15/473,001

(22) Filed: Mar. 29, 2017

(65) Prior Publication Data
US 2018/0285934 A1    Oct. 4, 2018

(51) Int. Cl.
*G06Q 30/02*    (2012.01)
(52) U.S. Cl.
CPC .............................. *G06Q 30/0269* (2013.01)
(58) Field of Classification Search
CPC .................................................... G06Q 30/02
USPC ..................................................... 705/14.66
See application file for complete search history.

(56) References Cited

U.S. PATENT DOCUMENTS

| | | | |
|---|---|---|---|
| 8,306,610 B2 | 11/2012 | Mirow | |
| 8,945,006 B2 | 2/2015 | Osorio | |
| 2012/0264796 A1 | 10/2012 | Evans et al. | |
| 2018/0107971 A1* | 4/2018 | Vukin .................. | G06Q 10/087 |

OTHER PUBLICATIONS

Anonymously; A Scalable, Non-Intrusive Method for Deriving a User's Circadian Typology Based on Personality Traits, Dec. 3, 2015.
Anonymously; A Method and System for Attributing Personal Sensor Data by Correlating Sensory Inputs, Mar. 23, 2016.
Duda, H. et al.; Health and Wellness Feb. 2014, 2014.
Kojima et al; Nano Size Biological Clock Capsulated by Lipid Layer, Jul. 2009.
(Continued)

*Primary Examiner* — Marilyn G Macasiano
(74) *Attorney, Agent, or Firm* — Garg Law Firm, PLLC; Rakesh Garg; James Nock

(57) ABSTRACT

A first Micro Circadian Rhythm (MCR) pattern is identified in a Circadian Rhythm (CR) data of a user. Using the first MCR pattern, a second MCR pattern is predicted during a forecast period. The second MCR pattern is correlated with a set of possible future CR states. A first model of a distribution of a confidence value corresponding to the present CR state of the user is constructed. A second model of a distribution of a confidence value corresponding to a selected future CR state from the set of possible future CR states of the user is constructed. The first model and the second model are correlated to determine a likelihood of the selected future CR state being reachable from the present CR state for the user. When the likelihood exceeding a threshold, an application is caused to adjust a process.

20 Claims, 5 Drawing Sheets

(56) References Cited

OTHER PUBLICATIONS

Abdullah et al; Towards Circadian Computing: "Early to Bed and Early to Rise" Makes Some of Us Unhealthy and Sleep Deprived, Sep. 2014 UbiComp '14: Proceedings of the 2014 ACM International Joint Conference on Pervasive and Ubiquitous Computing.
Dudurych et al; Tools for Handling High Amounts of Wind Generation in National Control Centre in Ireland, Jul. 2012.
Davenport et al; Know What Your Customers Want Before They Do, Dec. 2011.
Zhang et al; Optimal Circadian Rhythm Control with Light Input for Rapid Entrainment and Improved Vigilance, 51st IEEE Conference on Decision and Control Dec. 10-13, 2012. Maui, Hawaii, USA.
Murnane et al; Mobile Manifestations of Alertness: Connecting Biological Rhythms with Patterns of Smartphone App Use, Sep. 6-9, 2016, Florence, Italy.
Murnane et al; Social (Media) Jet Lag: How Usage of Social Technology Can Modulate and Reflect Circadian Rhythms, UBICOMP '15, Sep. 7-11, 2015, Osaka, Japan.
Tinnemeier et al; Programming Norm Change, May, 10-14, 2010, Toronto, Canada.
Tinnemeier et al; Programming Norm Chang, 2010, 957-964.

* cited by examiner

MICRO CIRCADIAN RHYTHMS DRIVEN DYNAMIC PRODUCT OFFERING ADJUSTMENT

TECHNICAL FIELD

The present invention relates generally to a method, system, and computer program product for adjusting an offering of a product, service, or advertising based on expected state of a customer. More particularly, the present invention relates to a method, system, and computer program product for micro Circadian rhythms driven dynamic product offering adjustment.

BACKGROUND

A circadian rhythm (CR) is a roughly 24-hour cycle in the physiological processes of living beings, including plants, animals, fungi, and cyanobacteria. In a strict sense, circadian rhythms are endogenously generated, although they can be modulated by external cues such as sunlight and temperature. Circadian rhythms are important in determining the sleeping and feeding patterns of all animals, including human beings. There are clear patterns of brain wave activity, hormone production, cell regeneration and other biological activities linked to this daily cycle.

A CR state is a state reached in the CR cycle at a given point in time. For example, being asleep is a CR state when the CR pattern suggests that the organism is asleep. Many other CR states similarly exists, e.g., being awake, being hungry, being agitated, being active, being lethargic, etc.

Humans transition from one CR state to another over a period of time. A micro circadian rhythm (MCR) comprises microscopic or minute changes in the CR that are indicative of a change in the CR. Particularly, MCRs are indicative of an upcoming change from one CR state to another CR state.

SUMMARY

The illustrative embodiments provide a method, system, and computer program product. An embodiment includes a method that identifies a first Micro Circadian Rhythm (MCR) pattern in a Circadian Rhythm (CR) data of a user. The embodiment predicts, using the first MCR pattern, a second MCR pattern during a forecast period. The embodiment correlates the second MCR pattern with a set of possible future CR states. The embodiment constructs a first model of a distribution of a confidence value corresponding to the present CR state of the user. The embodiment constructs a second model of a distribution of a confidence value corresponding to a selected future CR state from the set of possible future CR states of the user. The embodiment correlates the first model and the second model to determine a likelihood of the selected future CR state being reachable from the present CR state for the user. The embodiment causes, responsive to the likelihood exceeding a threshold, an application to adjust a process.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
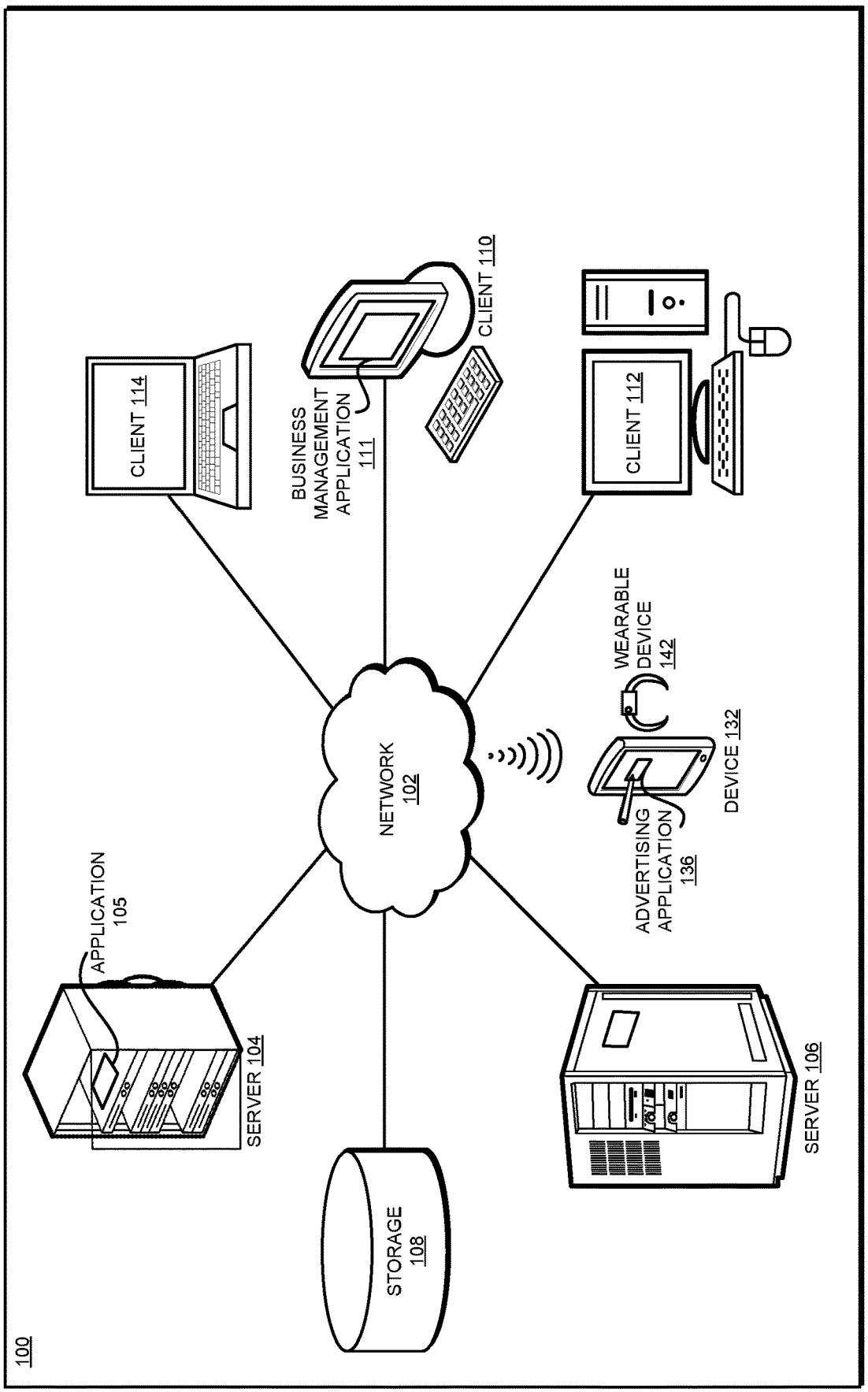
FIG. 1 depicts a block diagram of a network of data processing systems in which illustrative embodiments may be implemented.

The illustrative embodiments recognize in many cases, while a human consumer's CR states may be generally set as a matter of habit or practice, the CR of the consumer varies based on the location of the consumer at a given time, the cultural influences acting on the consumer over short and long periods of time, the context provided by the activities the consumer is engaged in at a given period, and the needs experienced by the consumer at a given time. These and many other factors similarly influence how the consumer will transition from one CR state to another, when or over how long a period will the transition occur, and what the final CR state of that transition be.

For example, the constantly available news feeds, round-the-clock data bombardment, long-distance air travel, and working or interacting with people across time zones, experienced by a consumer can be disruptive to the CR of the consumer and place the CR into new cycles. The illustrative embodiments recognize that the attention spans are now short spans of hyper-attention with continual context switching. With such changes becoming a part of routine life, the CR patterns of consumers have become increasingly erratic and the needs and wants of consumers are in flux.

Business enterprises often operate according to substantially fixed or pre-planned schedules and offerings. For example, most brick-and-mortar businesses operate from 9 AM to 9 PM, and offer predetermined subsets of their products or services offerings at predetermined times during the hours of operation. For example, a restaurant might open from 9 AM to 9 PM Mondays through Thursdays and 8 AM to 11 PM Fridays through Sundays, and offer their breakfast menu items from open till 11 AM, lunch menu items from 11 AM till 3 PM, and dinner menu items from 3 PM till close. Occasionally, a business might remain open or closed due to an event nearby. For example, a restaurant might remain open a little longer if a baseball game is going on at a nearby arena, or a shop might remain close for the observance of a religious holiday.

The illustrative embodiments recognize that even with such variations in the operating hours or offerings, the variations are not dynamic enough according to the day-to-day, hour-to-hour changes of the needs of individual consumers or groups of consumers. The illustrative embodiments also recognize that the change in the offerings and operations of a business are not responsive to a forecasted need of the consumers based on stimuli acting on the consumers' CR. Businesses must be more dynamic that the planned schedules and the occasional change due to pre-provided information about a game or other event. The operations and offerings of businesses should adjust according to the needs forecasts based on the MCRs of an individual consumer or a group of consumers.

The illustrative embodiments recognize that the presently available tools or solutions do not address these needs or provide adequate solutions for these needs. The illustrative embodiments used to describe the invention generally address and solve the above-described problems and other problems related to micro Circadian rhythms driven dynamic product offering adjustment.

An embodiment can be implemented as a software application. The application implementing an embodiment can be configured as a modification of an existing system, as an application executing in a data processing system communicating with an existing system, a standalone application, or some combination thereof.

An embodiment receives a consumer's CR data, e.g., from a wearable device or mobile device associated with the consumer. Many wearable devices and mobile device applications are presently available that measure the CR, and store or transmit the data of the measured CR.

By analyzing the CR data, the embodiment detects the presence of MCR at some point in time. One embodiment performs the forecasting, correlation, distribution, and notification operations described hereinbelow if an entity, e.g., a business entity that wishes to dynamically adjust an operation or an offering—has supplied a forecast period input.

The forecast period input specifies a period over which the entity wishes to make the dynamic adjustments. For example, a restaurant might be open for only fifteen more minutes and wishes to know if there is a sufficiently large group of consumers that can be expected to visit the restaurant after the planned closing time according to the CRs of the consumers in the group, and whether the restaurant should remain open past the planned closing time. Conversely, another example restaurant might have planned to remain open for another two hours but might want to know if there a number of consumers that can be expected to visit the restaurant over the next two hours is insignificant enough according to the CRs of those consumers that the restaurant could close early without significant loss of business.

MCRs can be regarded as a time-series. Accordingly, just as a time-series can be forecasted into the future based upon the knowledge of the factors that affect the time-series, a pattern of MCRs of a consumer can be forecasted into the future. An embodiment uses a forecasting engine to forecast a future pattern of the MCR for the consumer.

Using the forecasted MCRs, the embodiment forecasts one or more possible future CR states that are likely to be reached by the consumer. The forecasted MCR patterns, together with the historical knowledge of CR state transitions of the specific consumer, a generic consumer, consumers sharing some common characteristics that affect their CRs, or some combination thereof, can be used in a forecasting model to forecast the future CR state or states. In one embodiment, the Granger correlation method is used to determine a future CR state from the forecasted MCR pattern.

An embodiment models a present CR state of the consumer. A CR state can be determined by applying at least a subset of a set of influencer values to a prediction engine. An influencer value is a value of a factor that influences the CR of the consumer in some respect. Many examples of such influencers are described herein and many more will be apparent from this disclosure to those of ordinary skill in the art. Any number and types of influencers can be considered in the modeling of the current or present CR without departing the scope of the illustrative embodiments.

The embodiment computes an associated confidence value for the modeled present CR state. The confidence value is a function of a density of that CR state having been reached in a given window of time. For example, given the combination of the influencer values, the model may show that very few consumers (1×) have reached the modeled present CR state five minutes ago, some (3×) are likely to be in the state right now, significantly more (5×) are likely to reach the state in the next five minutes, some (2×) are likely to reach the state in the fifteen minutes thereafter, and an insignificant number (0.1×) are likely to reach the state over the following thirty minutes. Accordingly, the confidence value in the modelled present CR state can be distributed as a Poisson distribution of the confidence value over the given window of time.

Similarly, the embodiment models a forecasted future CR state. Knowing the influencer values at the present CR state, the embodiment predicts or forecasts the influencer values during a given future window. Using the forecasted influencer values, the embodiment can model a future CR state in a manner described with respect to modeling the present CR state.

For example, suppose a consumer is presently in a restaurant district with a CR state of "energetic excitement." The location—restaurant district—is an influencer with the value "restaurant district" or an equivalent thereof. Suppose that the consumer's historical patterns of traversals ("pattern of life") shows that when the consumer is in the restaurant district, the consumer spends several hours there. Accordingly, an embodiment can predict that the influencer—location in the restaurant district—will remain unchanged in the future two hours. Now, the embodiment can use the forecasted influencer value—location in the restaurant district—to model the future CR state, e.g., "hungry," e.g., due to the persistent aromas and other food-related stimuli. Again, the model distributes the forecasted future state according to the confidence value in a Poisson distribution.

An embodiment relates the model of the present CR state with a model of a forecasted future CR state. More than one such relations may be made between the present CR state model and each future CR state model depending upon the number of likely future CR states and their corresponding models an embodiment constructs.

As an example, the embodiment uses Skellam distribution to form the relationship between the models. Skellam distribution is the discrete probability distribution of the difference between two statistically independent variables the expected values of each of which have been Poisson distributed, as in the models that are being related. The relating of the present and future CR state models using Skellam distribution in this manner allows the computation of the probability that the future CR state will follow the present CR state.

Thus, one forecasted future CR state will emerge from the Skellam correlation as the most likely forecasted future CR state. An embodiment sends a notification about the forecasted future CR state, an expected window within which to expect that state, and a confidence with which that state will occur in the consumer. The notification is sent by the embodiment to an entity that wants to dynamically adjust their offering or operation according to the future CR states of the consumers.

The notification causes a business management system at the entity to effect a change in the offering or the operation. For example, one business management system may dynamically alter a closing time depending on a number and/or type of consumers who are forecasted to have a desired CR state during a desired forecast period and/or under certain circumstances. Another business management system may dynamically alter a product offering, e.g., offer breakfast menu items during lunch hours, depending on a number and/or type of consumers who are forecasted to have a desired CR state during a desired forecast period and/or under certain circumstances. Another business management system may dynamically alter a service offering, e.g., offer a cleaning service when otherwise they do not engage in cleaning services, depending on a number and/or type of consumers who are forecasted to have a desired CR state during a desired forecast period and/or under certain circumstances. Another business management system may dynamically alter an inventory, e.g., stock or plan to stock an item that is not otherwise stocked during a desired forecasted period, depending on a number and/or type of consumers who are forecasted to have a desired CR state during the desired forecast period and/or under certain circumstances. Another business management system may dynamically alter a content offering, e.g., change an advertising content, depending on a number and/or type of consumers who are forecasted to have a desired CR state during a desired forecast period and/or under certain circumstances.

The manner of micro Circadian rhythms driven dynamic product offering adjustment described herein is unavailable in the presently available methods. A method of an embodiment described herein, when implemented to execute on a device or data processing system, comprises substantial advancement of the functionality of that device or data processing system in dynamically altering an operation, offering, or both of a business enterprise according to dynamically changing forecasted CR states of dynamically changing consumer groups.

The illustrative embodiments are described with respect to certain types of measurements, CR data, patterns, cycles, states, influencers, values, periods, likelihoods, confidence values, distributions, correlations, relationships, notifications, adjustments, operations, offerings, content, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
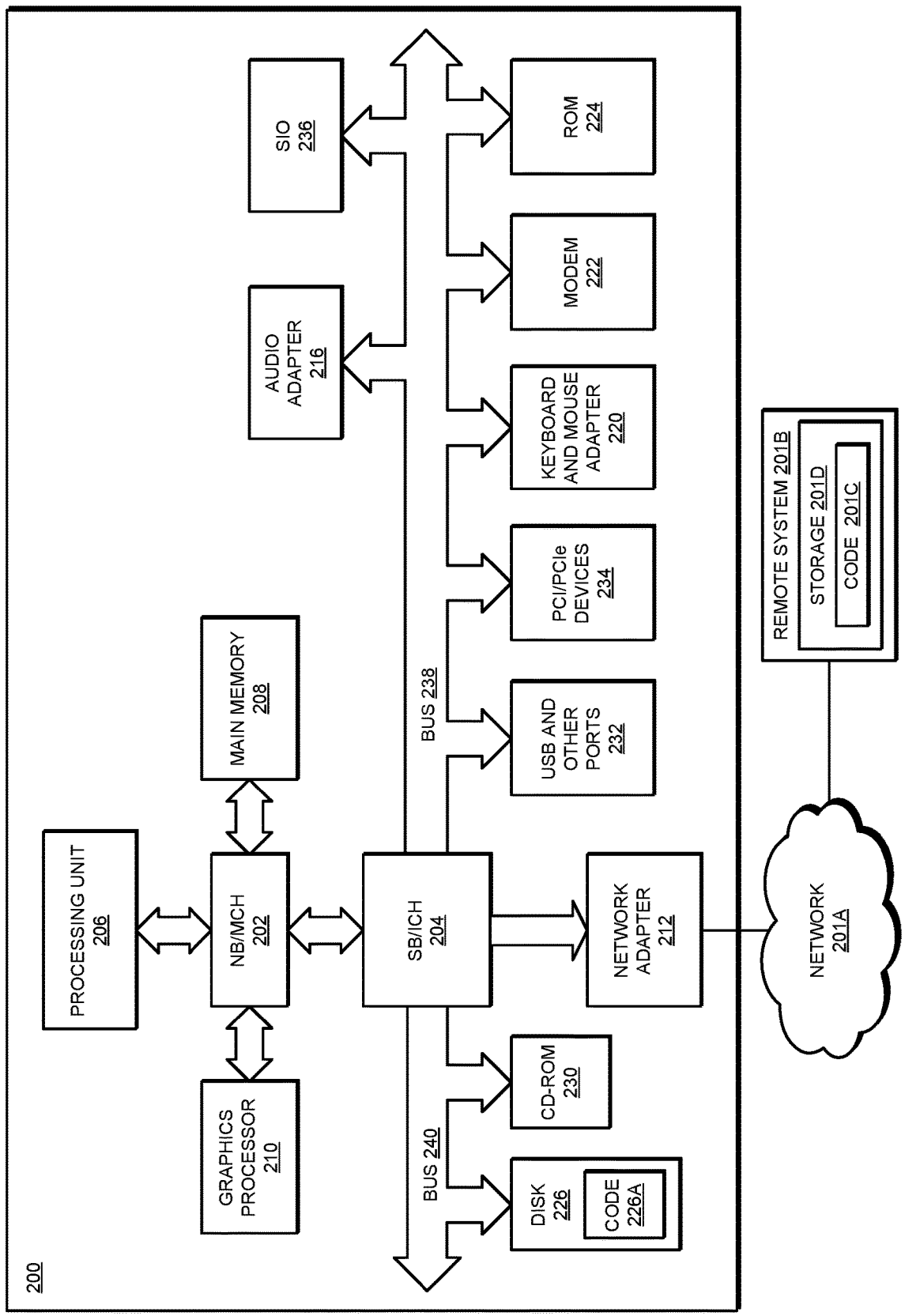
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Wearable device 142 operates alone or in conjunction with device 132 to measure and transmit CR data of a user to application 105. For example, a CR data application (not shown) may be implemented in wearable device 142, device 132, or in some combination of devices 132 and 142, to cause such measurements and transmission. Application 105 implements an embodiment described herein. Application 105 causes a notification to be transmitted to business management application 111 in client 110. Business management application 111 adjusts or alters an operation, an offering, or both, of a business enterprise based on the contents of the notification, as described herein. For example, business management application 111 may cause an advertising content or a product offering to change on advertising application 134 on device 132 depending on the forecasted future CR state of the user associated with device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
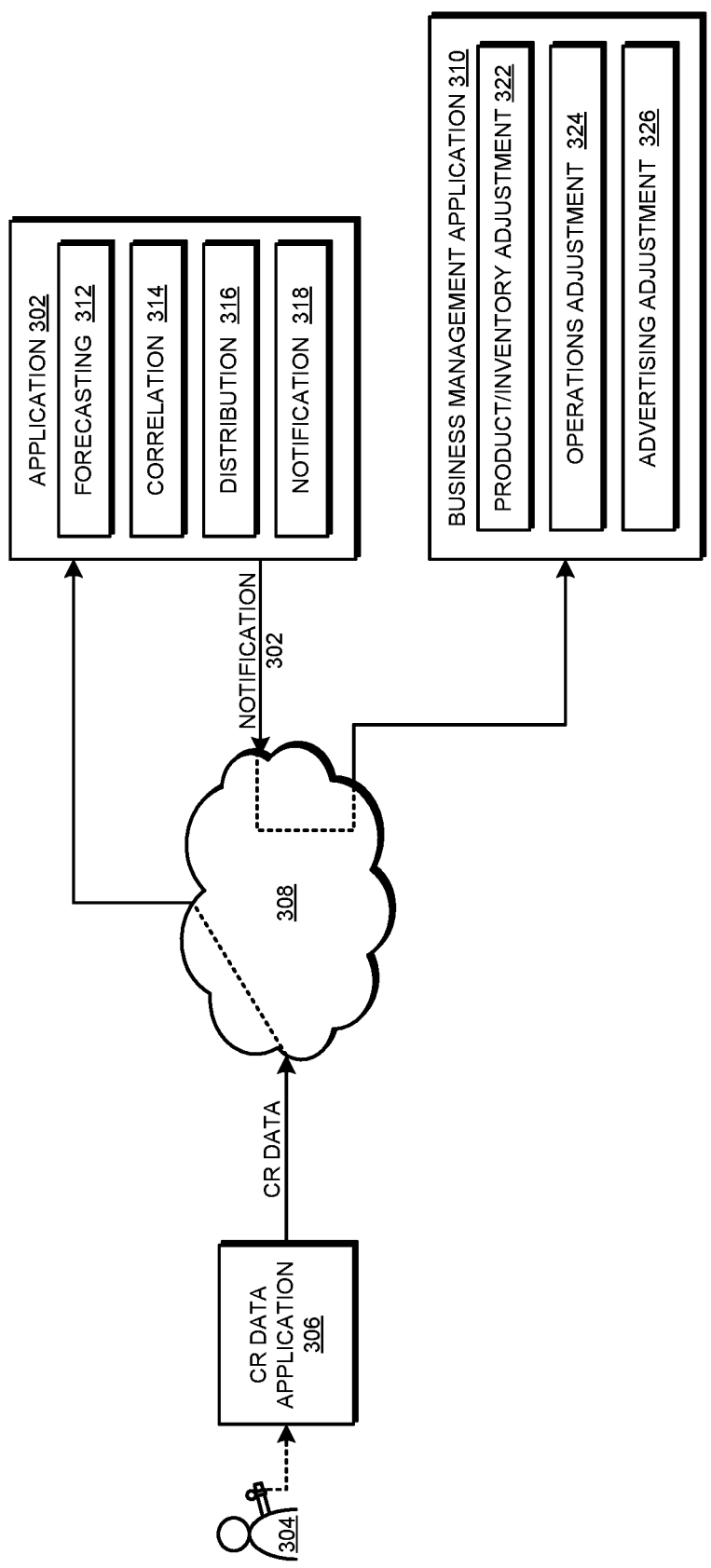
FIG. 3 depicts a block diagram of an example configuration for micro Circadian rhythms driven dynamic product offering adjustment in accordance with an illustrative embodiment.

With reference to FIG. 3, this figure depicts a block diagram of an example configuration for micro Circadian rhythms driven dynamic product offering adjustment in accordance with an illustrative embodiment. Application 302 is an example of application 105 in FIG. 1.

User 304 has a CR. CR data application 306 measures the CR and transmits the data of the measured CR over network 308 to application 302.

Application 302 includes component 312, which detects MCRs and forecasts the MCR patterns in a future period. Component 314 in application 302 correlates the forecasted MCR pattern and at least a subset of influencer values to one or more future CR states. Component 316 in application 302 constructs Poisson distribution models of the present CR state and the future CR states. Component 316 correlates the present CR state model with one or more future CR state models in a Skellam distribution method to predict the most likely future CR state. Component 318 produces notification 320.

Application 302 sends notification 320 over network 308 to business management application 310. Component 322 adjusts a product/service offering or an inventory according to notification 320. Component 324 adjusts an operation of an entity according to notification 320. Component 326 adjusts an advertising content according to notification 320.

Figure 4:
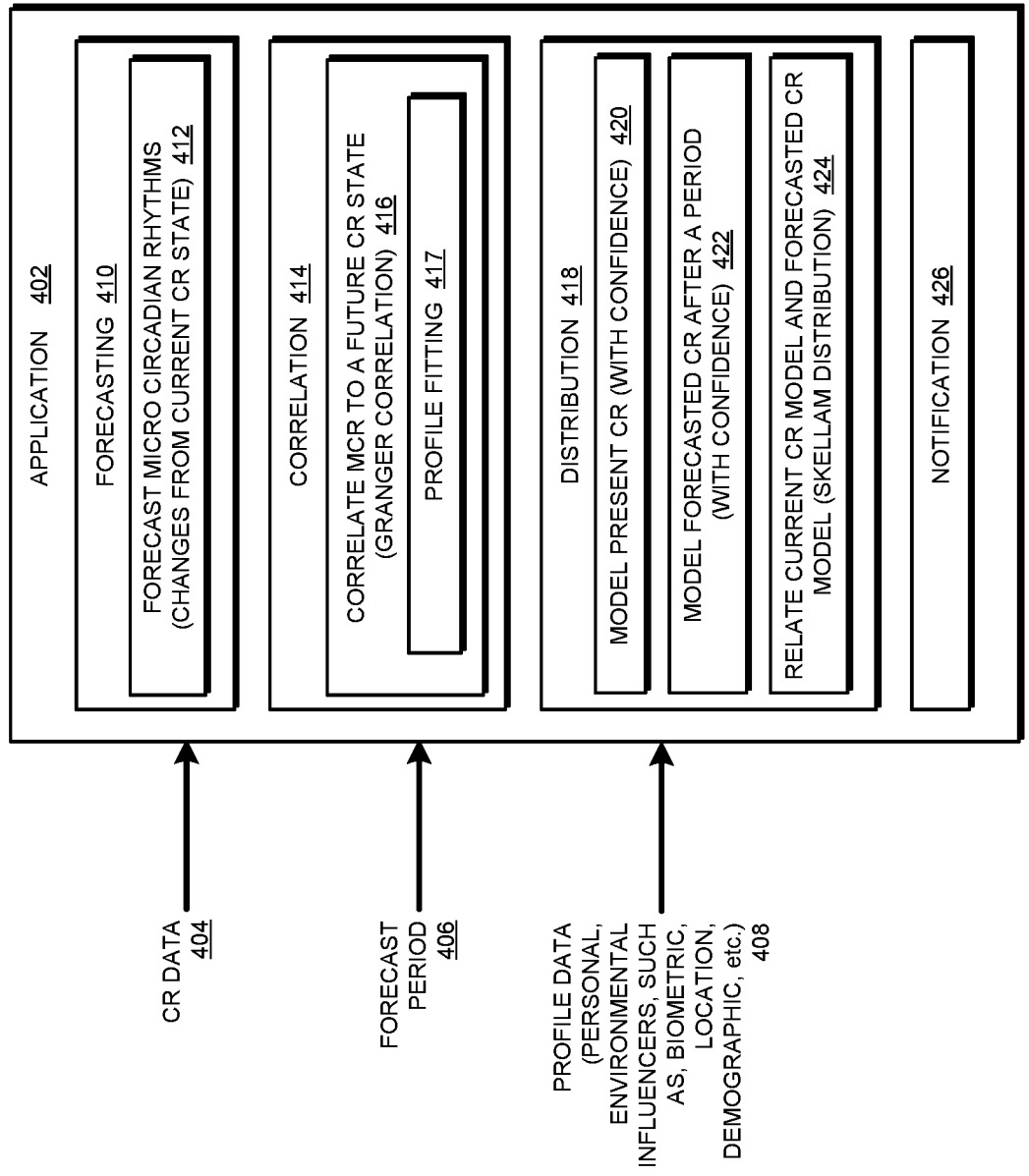
FIG. 4 depicts a block diagram of an application that can be used for micro Circadian rhythms driven dynamic product offering adjustment in accordance with an illustrative embodiment.

With reference to FIG. 4, this figure depicts a block diagram of an application that can be used for micro Circadian rhythms driven dynamic product offering adjustment in accordance with an illustrative embodiment. Application 402 is an example of application 302 in FIG. 3.

Input 404 comprises present CR data of a consumer. Input 404 may include CR data from one or more consumers. Input 406 is a forecast period over which a business entity desires forecasted CR states of a consumer or consumer groups. Profile data 408 comprises present values of personal, environmental of both types of influencers such as biometric influencers, location, demographic or cultural influencers, and many others.

Component 410 is an example of component 312 in FIG. 3. Subcomponent 412 forecasts an MCR pattern that would lead to a change from a present CR state, directly or via other CR states, to a future CR state during the forecast period of input 406.

Component 414 is an example of component 314 in FIG. 3. Subcomponent 416 correlates the forecasted MCR patter to a future CR state via Granger correlation. In selecting which future CR states are more likely than others, sub-subcomponent 417 performs profile fitting, which selects the future CR states according to the predicted future values of the influencers in profile data 408.

Component 418 is an example of component 316 in FIG. 3. Subcomponent 420 models a present CR state with a Poisson distribution of the confidence value associated therewith. Subcomponent 422 models one or more future CR states with corresponding Poisson distributions of the confidence values associated therewith. Subcomponent 424 relates the present CR state model with a future CR state model according to Skellam distribution.

Component 426 is an example of component 318 in FIG. 3. Component 426 uses the most likely one or more future CR states according to the Skellam correlation of subcomponent 424, and sends a notification to business management application 310 in FIG. 3, to cause an adjustment as described herein. Notification component 426 may combine the notification about the future CR states likely for more than one consumer, e.g., to inform the business management application about the dynamic state of a group of consumers.

Figure 5:
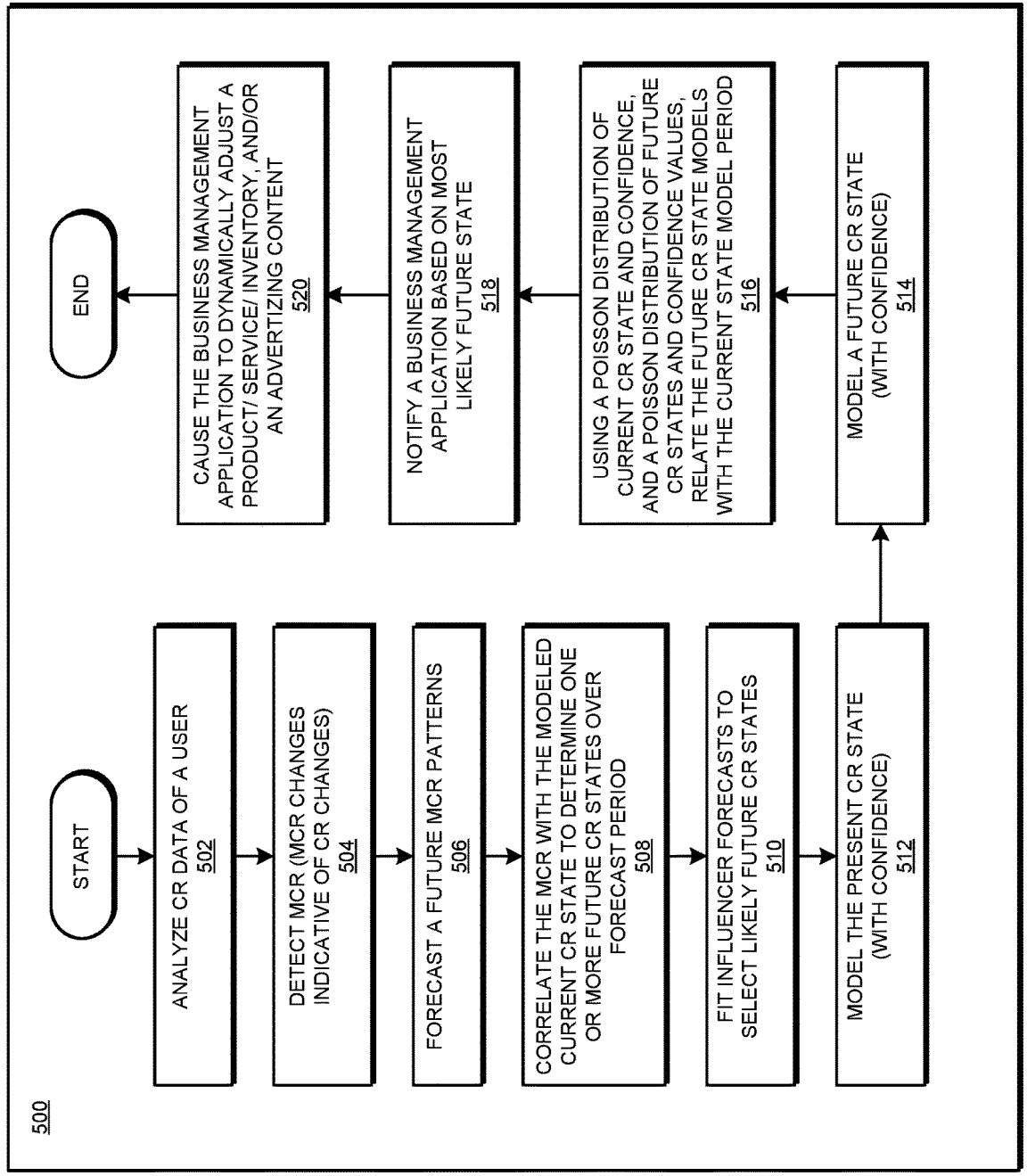
FIG. 5 depicts a flowchart of an example process for micro Circadian rhythms driven dynamic product offering adjustment in accordance with an illustrative embodiment.

With reference to FIG. 5, this figure depicts a flowchart of an example process for micro Circadian rhythms driven dynamic product offering adjustment in accordance with an illustrative embodiment. Process 500 can be implemented in application 402 in FIG. 4.

The application analyzes CR data of a consumer (block 502). The application detects an MCR pattern that is indicative of a CR state change (block 504). The application forecasts a future MCR pattern based on the detected MCR pattern (block 506).

The application correlates the forecasted MCR pattern with one or more possible future CR states over a specified forecast period, e.g., by using Granger correlation method (block 508). The application predicts and fits future influencer values to select those future CR states that are likely for the consumer given the predicted influencers (block 510).

The application models the present CR state with corresponding confidence values according to the CR state density in a present window of time (block 512). The application models a future CR state with corresponding confidence values according to the likely density of that CR state in a future time window during the forecast period (block 514).

Using Poisson distributions of the current (present) CR state confidence values and the modelled future CR state confidence values, the application applies a correlation method, e.g., the Skellam correlation method, to identify the most likely future CR state to be reached by the consumer during the forecast period and given the forecasted influencers applicable to the consumer during the forecast period (block 516). Blocks 514 and 516 may be repeated to identify the most likely future CR state.

The application notifies a business management application about the most likely future CR state (block 518). The application causes the business management application to dynamically adjust a product, service, content, or inventory according to the notification (block 520). The application ends process 500 thereafter.

Thus, a computer implemented method, system or apparatus, and computer program product are provided in the illustrative embodiments for micro Circadian rhythms driven dynamic product offering adjustment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   identifying a first Micro Circadian Rhythm (MCR) pattern in a Circadian Rhythm (CR) data of a user;
   predicting, using the first MCR pattern, a second MCR pattern during a forecast period;
   correlating the second MCR pattern with a set of possible future CR states;
   constructing a first model of a distribution of a confidence value corresponding to the present CR state of the user;
   constructing a second model of a distribution of a confidence value corresponding to a selected future CR state from the set of possible future CR states of the user;
   correlating the first model and the second model to determine a likelihood of the selected future CR state being reachable from the present CR state for the user; and
   causing, responsive to the likelihood exceeding a threshold, an application to adjust a process.

2. The method of claim 1, further comprising:
   receiving, from a device associated with the user, the CR data of the user;
   determining that a pattern in the CR data is indicative of an impending change from a present CR state to a different CR state; and
   designating the pattern in the CR data the first MCR pattern.

3. The method of claim 1, wherein the application specifies the forecast period.

4. The method of claim 1, further comprising:
   using, as a part of the correlating the second MCR pattern with the set of possible future CR states, a Granger correlation process.

5. The method of claim 1, further comprising:
   receiving a set of influencer values with the CR data, wherein each influencer value in the set of influencer values is a present value of a corresponding influencer factor in a set of influencer factors that is causally related to the present CR state of the user.

6. The method of claim 5, further comprising:
   predicting a future set of influencer values for the set of influencer factors, wherein the future set of influencer values are likely for the user during the forecast period.

7. The method of claim 5, wherein a first influencer factor is a cultural factor of the user.

8. The method of claim 5, wherein a first influencer factor is a demographic factor of the user.

9. The method of claim 5, wherein a first influencer factor is an environmental weather factor of the user.

10. The method of claim 5, wherein a first influencer factor is a location factor of the user.

11. The method of claim 1, wherein the first model is a first Poisson distribution model, and wherein the second model is a second Poisson distribution model.

12. The method of claim 1, further comprising:
    using, as a part of the correlating the first model and the second model, a Skellam correlation process.

13. The method of claim 1, wherein the adjusted process is an offering of a product.

14. The method of claim 1, wherein the adjusted process is a presenting of an advertising content.

15. The method of claim 1, wherein the adjusted process is a change in a timing of an operation.

16. The method of claim 1, wherein the adjusted process is an offering of a service.

17. A computer usable program product comprising a computer-readable storage device, and program instructions stored on the storage device, the stored program instructions when executed using a processor causing operations, the operations comprising:
    identifying a first Micro Circadian Rhythm (MCR) pattern in a Circadian Rhythm (CR) data of a user;
    predicting, using the first MCR pattern, a second MCR pattern during a forecast period;
    correlating the second MCR pattern with a set of possible future CR states;
    constructing a first model of a distribution of a confidence value corresponding to the present CR state of the user;
    constructing a second model of a distribution of a confidence value corresponding to a selected future CR state from the set of possible future CR states of the user;
    correlating the first model and the second model to determine a likelihood of the selected future CR state being reachable from the present CR state for the user; and
    causing, responsive to the likelihood exceeding a threshold, an application to adjust a process.

18. The computer usable program product of claim 17, wherein the stored program instructions are stored in the computer readable storage device in a data processing system, and wherein the stored program instructions are transferred over a network from a remote data processing system.

19. The computer usable program product of claim 17, wherein the stored program instructions are stored in the computer readable storage device in a server data processing system, and wherein the stored program instructions are downloaded over a network to a remote data processing system for use in a second computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to identify a first Micro Circadian Rhythm (MCR) pattern in a Circadian Rhythm (CR) data of a user;
    program instructions to predict, using the first MCR pattern, a second MCR pattern during a forecast period;
    program instructions to correlate the second MCR pattern with a set of possible future CR states;
    program instructions to construct a first model of a distribution of a confidence value corresponding to the present CR state of the user;
    program instructions to construct a second model of a distribution of a confidence value corresponding to a selected future CR state from the set of possible future CR states of the user;
    program instructions to correlate the first model and the second model to determine a likelihood of the selected future CR state being reachable from the present CR state for the user; and
    program instructions to cause, responsive to the likelihood exceeding a threshold, an application to adjust a process.

* * * * *